(12) United States Patent
Paul et al.

(10) Patent No.: US 11,636,492 B2
(45) Date of Patent: Apr. 25, 2023

(54) SYSTEMS AND METHODS FOR SELECTING A WORST SERVICE FIRST PRIORITY GRID TEST ROUTE PATH

(71) Applicant: PC-TEL, Inc., Bloomingdale, IL (US)

(72) Inventors: Sumeet Singh Paul, Evanston, IL (US); Stephen V. Saliga, Akron, OH (US)

(73) Assignee: PCTEL, INC., Bloomingdale, IL (US)

( * ) Notice: Subject to any disclaimer, the term of this patent is extended or adjusted under 35 U.S.C. 154(b) by 421 days.

(21) Appl. No.: 16/989,380

(22) Filed: Aug. 10, 2020

(65) Prior Publication Data
US 2021/0042760 A1    Feb. 11, 2021

Related U.S. Application Data

(60) Provisional application No. 62/884,976, filed on Aug. 9, 2019.

(51) Int. Cl.
| | |
|---|---|
| *G06Q 30/018* | (2023.01) |
| *H04B 17/391* | (2015.01) |
| *H04W 4/33* | (2018.01) |
| *G01C 21/20* | (2006.01) |
| *G06Q 10/04* | (2023.01) |
| *G06F 16/29* | (2019.01) |
| *G06N 5/04* | (2023.01) |
| *G06Q 50/26* | (2012.01) |

(52) U.S. Cl.
CPC ......... *G06Q 30/018* (2013.01); *G01C 21/206* (2013.01); *G06F 16/29* (2019.01); *G06N 5/04* (2013.01); *G06Q 10/04* (2013.01); *G06Q 50/26* (2013.01); *H04B 17/3913* (2015.01); *H04W 4/33* (2018.02)

(58) Field of Classification Search
CPC .................................................. G06Q 30/018
See application file for complete search history.

(56) References Cited

U.S. PATENT DOCUMENTS

| | | |
|---|---|---|
| 7,035,643 B2 | 4/2006 | Slawitschka et al. |
| 8,503,336 B2 | 8/2013 | Rappaport et al. |
| 9,380,425 B2 | 6/2016 | Meredith et al. |

(Continued)

OTHER PUBLICATIONS

International Preliminary Report on Patentability issued for International Application No. PCT/US2020/045679 dated Feb. 8, 2022, 5 pages.

(Continued)

*Primary Examiner* — Michael A Berns
(74) *Attorney, Agent, or Firm* — Husch Blackwell LLP

(57) ABSTRACT

Systems and methods for selecting a worst service first optimized test path are provided. Such systems and methods can include using previously collected RF results that are relevant to a target building to calculate predictive RF results for a plurality of test points in the target building, using the predictive RF results to calculate the optimized test path through the target building, measuring a respective actual RF signal value of each of the plurality of test points in succession along the optimized test path, counting failing ones of the plurality of test points, and stopping measurements of the respective actual RF signal value of each of the plurality test points when a counted number of the failing ones of the plurality of test points exceeds a failure threshold value.

18 Claims, 3 Drawing Sheets

(56) References Cited

U.S. PATENT DOCUMENTS

| | | | |
|---|---|---|---|
| 11,184,871 B2* | 11/2021 | Paul | H04W 56/0015 |
| 2016/0374006 A1 | 12/2016 | Chen | |
| 2021/0042760 A1* | 2/2021 | Paul | G06N 5/04 |

OTHER PUBLICATIONS

International Search Report from corresponding WO patent application PCT/US20/45679, dated Oct. 28, 2020.

Written Opininon of The International Searching Authority from corresponding WO patent application PCT/US20/45679, dated Oct. 28, 2020.

* cited by examiner

SYSTEMS AND METHODS FOR SELECTING A WORST SERVICE FIRST PRIORITY GRID TEST ROUTE PATH

CROSS REFERENCE TO RELATED APPLICATIONS

This application claims priority to U.S. Application No. 62/884,976 filed Aug. 9, 2019 and titled "SYSTEMS AND METHODS FOR SELECTING A WORST SERVICE FIRST PRIORITY GRID TEST ROUTE PATH." U.S. Application No. 62/884,976 is hereby fully incorporated by reference as if set forth fully herein.

FIELD

The present invention relates generally to systems and methods for testing a public safety network. More particularly, the present invention relates to systems and methods for selecting a worst service first priority grid test route path.

BACKGROUND

Known systems and methods for testing a public safety network in a building include a user walking through the building to collect coverage data of the public safety network for a public safety communication system and spatially organizing the coverage data via a grid overlaid on a floor plan of the building on a floor by floor basis. For example, the user is tasked with walking to areas in the building represented by areas on the grid and collecting the coverage data from approximate centers of those areas. Typically, the grid is defined in X and Y coordinates, and each of the areas on the grid represents a respective one of the areas in the building that is several square meters in size. The user must populate each of areas on the grid with the coverage data prior to determining whether the building requires correction and prior to submitting an associated certification request, for example, for occupancy permits, to a relevant municipality.

Some known systems and methods require the user to manually record the coverage data, and some known systems and methods automatically collect and process the coverage data. However, all known systems and methods still require the user walk to $X*Y*F$ test points for collecting the coverage data, where the grid overlaid on the floor plan of the building is defined in X and Y coordinates, and where F is a number of floors in the building. Accordingly, known systems and methods require at least $X*Y*F*(TSc+TSw)$ amount of time to execute, where TSc is time in seconds to collect the coverage data at a single one of the test points, and where TSw is an average time to walk between the test points. Indeed, in some cases, known systems and methods could require at least $X*Y*F*(TSc+TSw)+F*(TSf)$ amount of time to execute, where TSf is time in seconds to move between the floors in the building.

In most jurisdictions, at least a minimum pass threshold percentage of the areas on the grid for one of the floors in the building must pass, for example, by the coverage data complying with a predetermined standard or threshold, for that one of the floors to pass. Similarly, the grid for at least the minimum pass threshold percentage of the floors in the building must pass for the building to pass. Accordingly, to achieve a result that enables the user to determine whether the building requires correction and that enables the user to submit the associated certification request to the relevant municipality, the user must effectively walk to at least the minimum pass threshold percentage number of the points, that is, $X*Y*MPTp*F*(TSc+TSw)+F*(TSf)$ test points, where MPTp is the minimum pass threshold percentage. In some cases, this can amount to a substantial amount of manual labor and effort.

In view of the above, there is a continuing, ongoing need for improved systems and methods.

DETAILED DESCRIPTION

Figure 1:
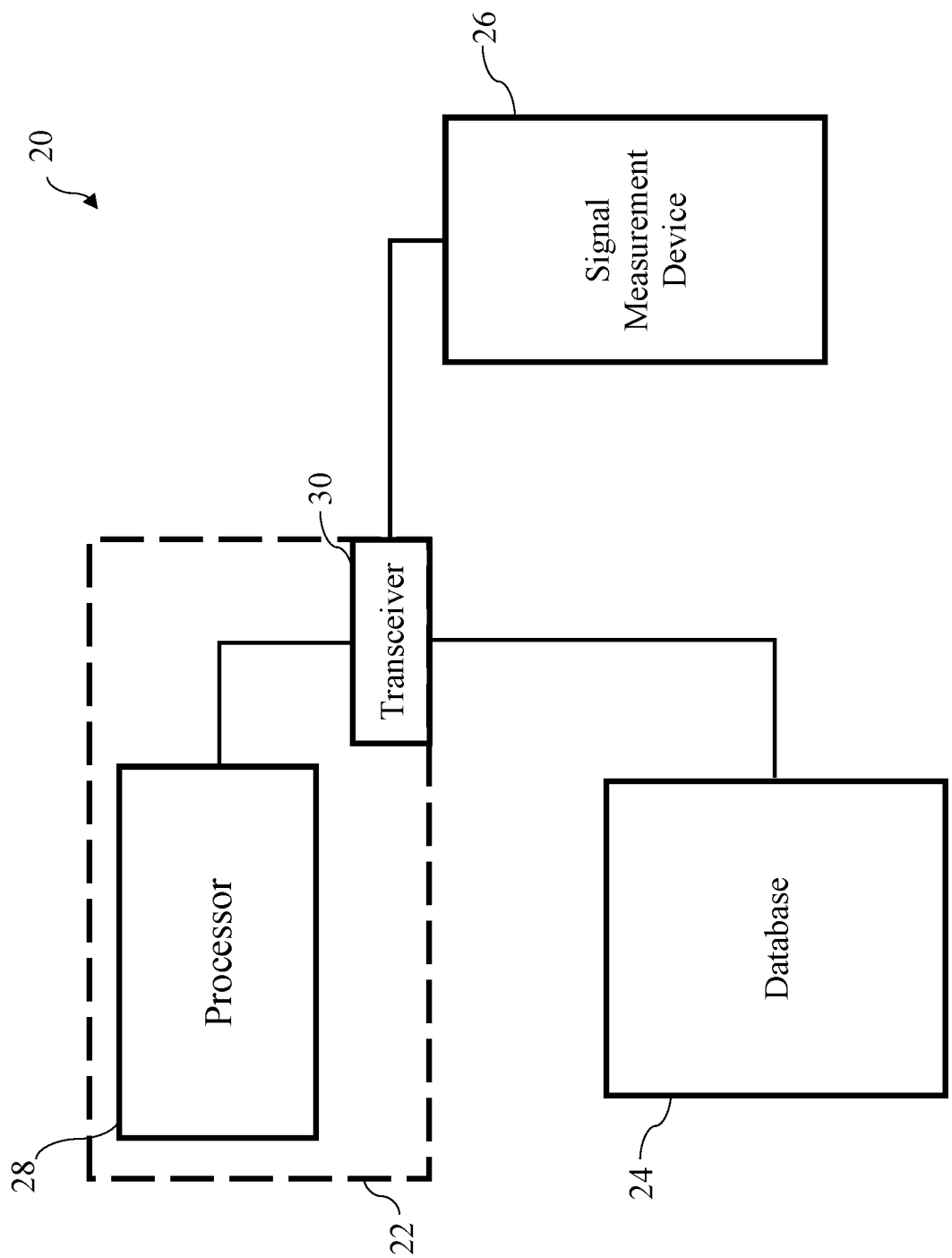
FIG. 1 is block diagram of a system according to disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for selecting a worst service first priority grid test route path. For example, systems and methods disclosed herein can differentiate between a final certification walk test and a preliminary walk test executed to establish baselines of buildings before retrofitting and correction. Accordingly, prior to executing the final certification walk for a target building, systems and methods disclosed herein can use a collection of available data from adjacent buildings to predictively identify which areas of the target building are most likely to fail the final certification walk test and either (a) calculate whether enough of the areas of the target building that are most likely to fail exceed the areas of the target building that are most likely to pass and, therefore, determine that retrofitting and correction is necessary prior to ordering or executing the final certification walk test or (b) calculate whether enough of the areas of the target building that are most likely to fail are less than the areas of the target building that are mostly likely to pass and, therefore, determine that ordering the final certification walk test is prudent.

In accordance with disclosed embodiments, systems and methods can store grid test results, that is, coverage data, and/or certification results based on the grid test results in a database that organizes, stores, and/or cross-references the grid test results with geographic information for locations related to the grid test results, for example, where underlying data associated with the grid test results was collected or where the underlying data associated with the grid test results originated. In some embodiments, the geographic information can include a building address, a property identification number (PIN), a GPS location, a GPS index, a building diagram, a floor map, and/or a height of a building.

As disclosed and described herein, a target building can include a building without grid test results and certification results, and systems and methods disclosed herein can use the grid test results and/or the certification results for other buildings surrounding the target building to calculate, estimate, or approximate a predictive coverage map of the target building. For example, in some embodiments, systems and methods disclosed herein can access the database to identify the grid test results (first ones of the grid test results) most recently collected at each frequency of a network being tested (e.g. a public safety network) in a closest one of the other buildings by geographic distance to a grid test point for the target building on each side of X, Y, and Z axes.

Then, systems and methods disclosed herein can translate the first ones of the grid test results into rough estimates for grid values of the target building. For example, because the underlying data of the first ones of the grid test results originated from inside of the closest one of the other buildings, it can be understood that the first ones of the grid test results are first indoor RF results. Accordingly, systems and methods disclosed herein can translate the first ones of the grid test results to first outdoor RF results using known, typical, and/or predetermined building materials loss data. Then, systems and methods disclosed herein can translate the first outdoor RF results to second outdoor RF results adjacent the grid test point for the target building using known, typical, and/or predetermined outdoor propagation models. Next, systems and methods disclosed herein can translate the second outdoor RF results to second indoor RF results using the known, typical, and/or predetermined building materials loss data, and it can be understood that the second indoor RF results can be a starting RF result for the grid test point for the target building. Finally, systems and methods disclosed herein can use the starting RF result for the grid test point for the target building to generate predictive RF results for and the predictive coverage map of the target building using known, typical, and/or predetermined indoor propagation models, for example, in a linear manner and on a floor by floor basis. In this regard, the predictive coverage map can predictively identify whether test points on a grid of the target building predictively pass or predictively fail.

Using the predictive coverage map of the target building, systems and methods disclosed herein can calculate an optimized test path for the building that reaches only 1-MPTp of the test points that predictively failed, where MPTp is a minimum pass threshold percentage. For example, systems and methods disclosed herein can identify a number of the test points that predictively failed adjacent to one another on each floor of the target building by giving each of those test points a respective value incremented by one for itself and for each of those test points adjacent thereto that predictively failed. Then, systems and methods disclosed herein can identify a respective grid value for each floor of the target building based on the respective value of each of the test points on that floor. Next, systems and methods disclosed herein can identify a respective score for each floor of the target building by combining the respective grid value for that floor and the respective grid value for floors immediately above and below that floor. Finally, systems and methods disclosed herein can construct the optimized test path using the identified data for the test grid of the target building.

For example, in some embodiments, the optimized test path can be transmitted to a signal measurement device or a similar portable user device. Then, the signal measurement device or the similar portable user device can direct a user thereof from a lowest floor of the target building to a highest scored floor of the target building and direct the user to walk to a highest valued one of the test points on the highest scored floor of the target building by stopping at all of the test points on such a path to the highest valued one of the test points on the highest scored floor of the target building.

If necessary, then the signal measurement device or the similar portable user device can direct the user to walk to a next highly valued one of the test points on the highest scored floor of the target building in a similar manner until the grid test results for all of the test points that predictively failed are collected. Similarly, if necessary, then the signal measurement device or the similar portable user device can also direct the user to a next highly scored floor of the target building in a similar manner until the grid test results for each floor in the target building are collected. In some embodiments, the signal measurement device or the similar portable user device can direct the user to an adjacent floor of the target building immediately above one floor of the target building immediately after directing the user to walk test that one floor of the target building and before identifying the next highly scored floor of the target building.

At each of the test points at which the user stops, the signal measurement device or the similar portable user device can collect and/or record the grid test results. In accordance with disclosed embodiments, the signal measurement device or the similar portable user device can count how many of the test points at which the grid test results have been collected and recorded and then direct the user to complete testing (e.g. to stop measuring the grid test results) once a minimum number of the test points that exceeds the minimum pass threshold percentage have been counted, thereby identifying an end of the optimized test path.

As an exemplary, but non-limiting use case scenario, a building owner can request an inspection of an owned building via an automated system owned and/or operated by a local municipality. Responsive thereto, the automated system can use the grid test results and/or the certification results for the other buildings surrounding the owned building to calculate the predictive coverage map of the owned building. Responsive thereto, the automated system can require the building owner to remediate the test points in the owned building that predictively failed and provide the optimized test path for the owned building via which the building owner can walk the minimum number of the test points to collect and record the grid test results, thereby proving compliance before the automated system will commission the final certification walk test for the owned building, and thereby saving the municipality expenses associated with commissioning the final certification walk test when the owned building is likely to fail.

FIG. 1 is a block diagram of a system 20 according to disclosed embodiments. As seen in FIG. 1, in some embodiments, the system 20 can include an electronic device 22, a database device 24 storing previously collected grid test results for a plurality of geographic areas, and a signal measurement device 26. In some embodiments, the electronic device 22 can include a programmable processor 28 and a transceiver device 30. Various embodiments for the electronic device 22, such as a server device, a personal computer device, a mobile device, etc., are contemplated, and in some embodiments, the electronic device 22 and the user signal measurement device 26 can form a single, unitary device.

Figure 2:
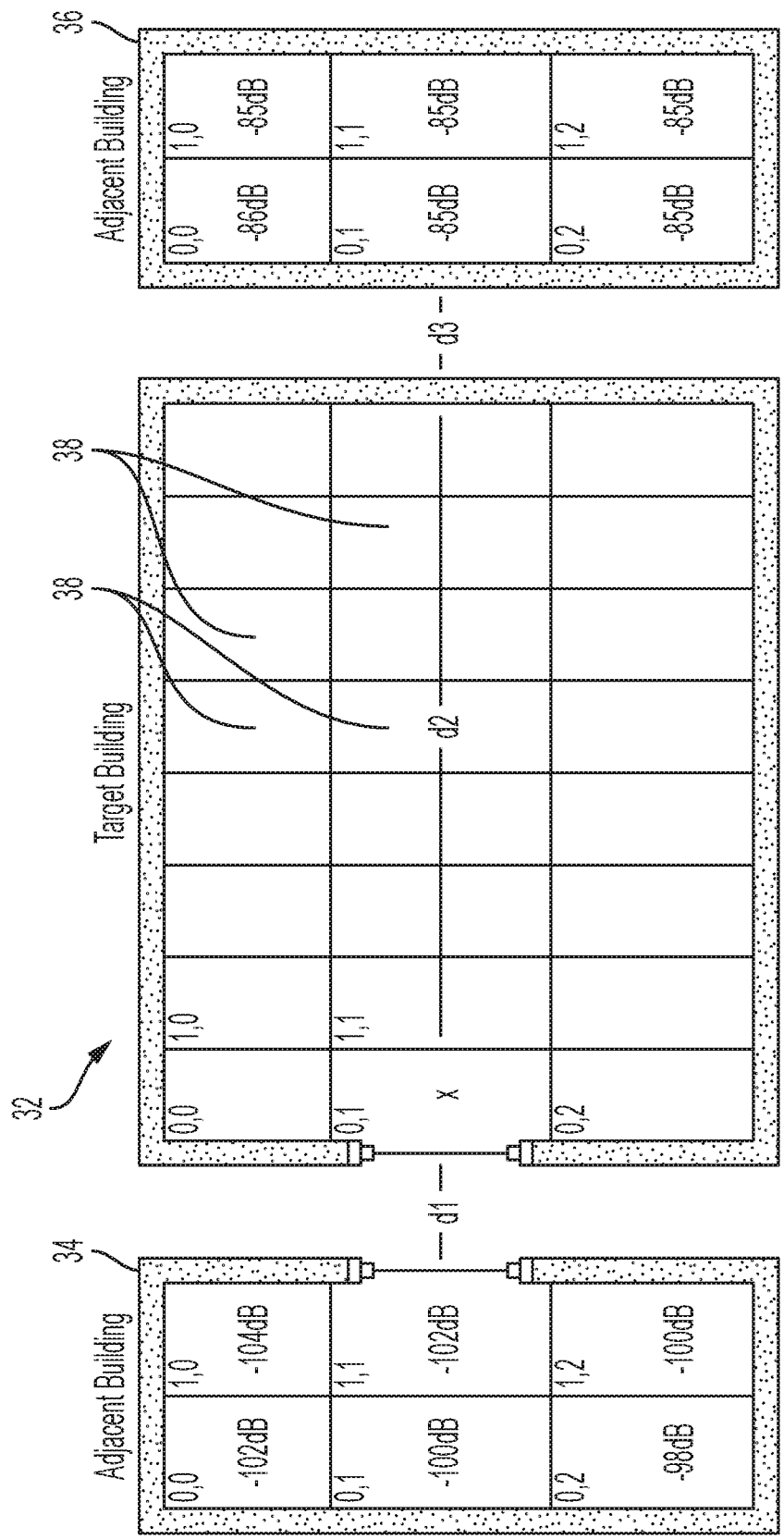
FIG. 2 is a block diagram of a grid of a target building according to disclosed embodiments.
Figure 3:
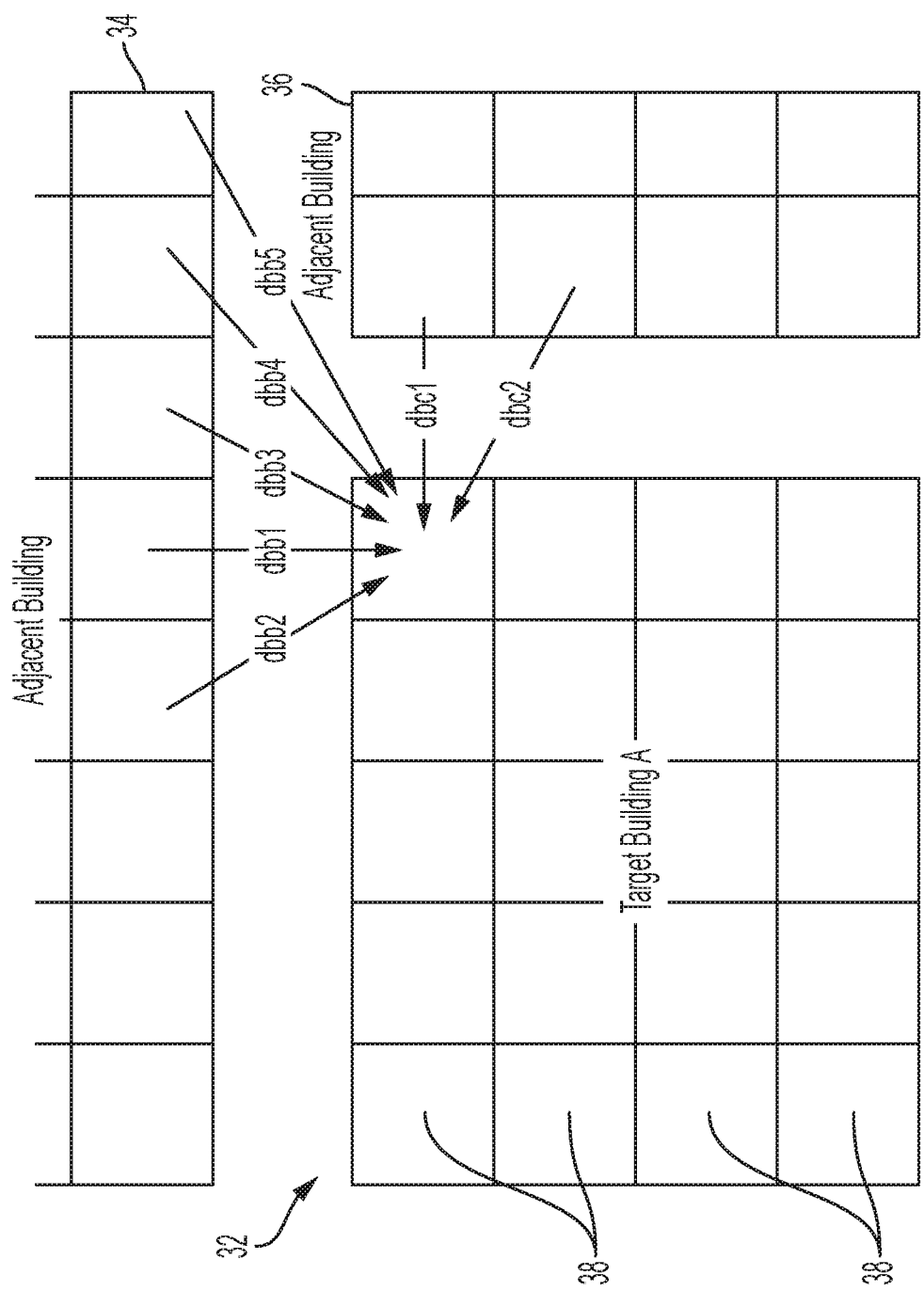
FIG. 3 is a block diagram of a grid of a target building according to disclosed embodiments.

FIG. 2 and FIG. 3 are block diagrams of grids of a target building 32 and adjacent buildings 34, 36 according to disclosed embodiments. In operation, the electronic device 22 can calculate, estimate, or approximate a predictive coverage map of the target building 32 by using the previously collected grid test results for the adjacent buildings 34, 36 stored in the database device 24 to generate predictive RF results for a plurality of test points 38 on the grid of the target building 32. Then, the electronic device 22 can calculate an optimized test path through the target building 32 for measuring a respective actual RF signal value at each of the plurality of test points 38. In some embodiments, the optimized test path can be configured for a user to most quickly assess whether the respective actual RF signal value at each of a minimum number of the plurality of test points 38 is a failing value, thereby preventing the target building 28 from passing a certification walk test.

For example, in some embodiments the programmable processor 28 can assign each of the plurality of test points 38 to a respective physical space of the target building 32 and retrieve the previously collected grid test results that are relevant to the target building 32 from the database device 22. In some embodiments, the previously collected grid test results that are relevant to the target building 32 can be those results that are associated with the adjacent buildings 34, 36 that are proximate to the target building 32, and in some embodiments, the previously collected grid test results that are relevant to the target building 32 can include those results that are associated with the plurality of geographic areas in the adjacent buildings 34, 36 that are closest to the target building 32. Still further, in some embodiments, the previously collected grid test results that are relevant to the target building 32 can include those results that are associated with the plurality of geographic areas within a respective line of sight of each of the plurality of test points 38.

In some embodiments, after retrieving the previously collected grid test results that are relevant to the target building 32 from the database device 22, the programmable processor 28 can use the previously collected grid test results that are relevant to the target building to calculate a respective predictive RF result for each of the plurality of test points 38, use the respective predictive RF result for each of the plurality of test points 38 to calculate the optimized test path through the target building 32, and transmit, via the transceiver device 30, the optimized test path to the signal measurement device 26.

In some embodiments, the programmable processor 28 can calculate the respective predictive RF result for each of the plurality of test points 38 by decreasing the previously collected grid test results that are relevant to the target building 32 based on (1) a respective size of a respective one of the plurality of test points 38, (2) a distance between the respective one of the plurality of test points 38 and the plurality of geographic areas in the adjacent buildings 34, 36 associated with the previously collected grid test results that are relevant to the target building 32, and (3) applicable radiation loss factors. When the previously collected grid test results that are relevant to the target building 32 includes those results that are associated with the plurality of geographic areas within the respective line of sight of each of the test points 38, the programmable processor 28 can average the previously collected grid test results as decreased with respect to each of the plurality of geographic areas within the line of sight of the respective one of the plurality of test points 38.

In some embodiments, the applicable radiation loss factors can include standard radiation loss through air. Additionally or alternatively, in some embodiments, the applicable radiation loss factors can include standard radiation loss through standard building materials and/or a thickness of walls of the target building 32 and the adjacent buildings 34, 36.

An exemplary, but non-limiting example of calculating the respective predictive RF results for one of the plurality of test points 38 can include starting with an original value of one of the previously collected grid test results that are relevant to the target building 32, decreasing the original value by half of a size of a respective one of the plurality of geographic areas in the adjacent buildings 34, 36 and associated with the one of the previously collected grid test results in a direction between a relative position of the one of the plurality of test points 38 and the respective one of the plurality of geographic areas in the adjacent buildings 34, 36 and associated with the one of the one of the plurality of previously collected grid test results, multiplying that decreased value by radiation loss in free air to account for free air signal loss from a center of the respective one of the plurality of geographic areas, decreasing that product by radiation loss in the standard building materials times the thickness of the walls in the adjacent buildings 34, 36, multiplying that decreased value by the radiation loss in free air to account for free air signal loss between the target building 32 and the adjacent buildings 34, 36, decreasing that by the radiation loss in the standard building materials times the thickness of the walls in the target building 32, and multiplying that decreased value by the radiation loss in free air to account for free air signal loss to a center of the one of the plurality of test points 38. In accordance with the above, when the previously collected grid test results that are relevant to the target building 32 includes those results that are associated with the plurality of geographic areas within the respective line of sight of each of the test points 38, the respective predictive RF results for the one of the plurality of test points 38 can be calculated with the following equation:

$$TargetGridSignal = \sum alllineofsitepaths * \frac{\left(\left(\sum \frac{1}{2} GridWidthTargetBuilding + \frac{1}{2} GridWidthAdjacentBuidling * SignalLossRateFreeair\right) + \left(\begin{array}{c} 2 * AverageExteriorWallThickness * \\ SignalLossRateExteriorWall \end{array}\right)\right)}{(\text{Number of Direct Line of Site Paths})}$$

Another exemplary, but not-limiting example of calculating the respective predictive RF results for one of the plurality of test points 38 is illustrated in FIG. 2. As seen in FIG. 2, the predictive RF results $X_{0,1}$ for test point 0,1 in the plurality of test points 38 can be calculated by using the previously collected grid test results for grid element AB11,1 of the adjacent building 34 and grid element AB20,1 of the adjacent building 36. In particular, the predictive RF results $X_{0,1}$ can be calculated with the following equation:

$X_{0,1}$=Max(((*AB*11,1−LossWindow)*
    (ExteriorDistanceSignalLoss*$d1$))−LossWindow,
    (((*AB*20,1−LossWall)*
    (ExteriorDistanceSignalLoss*$d3$))−LossWall)*
    (InteriorDistanceSignalLoss*$d2$))

where LossWindow is the standard radiation loss through a window, ExteriorDistanceSignalLoss is the radiation loss in free air outside, LossWall is the standard radiation loss through a wall, and InteriorDistanceSignalLoss is the standard radiation loss in free air inside.

In some embodiments, once the signal measurement device 26 receives the optimized test path, the signal measurement device 26 can begin measuring the respective actual RF signal value at each of the plurality of test points 38 in succession along the optimized test path, count failing ones of the plurality of test points 38 for which the respective actual RF signal value is below a passing threshold value, and when a counted number of the failing ones of the plurality of test points 38 exceeds a failure threshold value, stop measuring the respective actual RF signal value of each of the plurality of test points 38 in succession along the optimized test path.

In some embodiments, the optimized test path can be limited to the plurality of test points 38 for which the respective predictive RF result is below the passing threshold value and the plurality of test points 38 on the shortest path therebetween. In these embodiments, when the counted number of the failing ones of the plurality of test points 38 fails to exceed the failure threshold value and the respective actual RF signal value for all of the plurality of test points 38 for which the respective predictive RF result is below the passing threshold value have been measured, the signal measurement device 26 can instruct the user to complete collection of all remaining ones of the plurality of test points 38 that have yet to be measured.

In some embodiments, the programmable processor 28 can begin calculating the optimized test path by designating as a starting location for the optimized test path a first one of the plurality of target test points 38 for which the respective predictive RF result is lowest as compared with the respective predictive RF result for each of the plurality of test points 38. Then, the programmable processor 28 can iteratively designate subsequent locations on the optimized test path beyond the starting location based on previous locations on the optimized test path.

For example, in some embodiments, the programmable processor 28 can select a subsequent location on the optimized test path as one of the plurality of test points 38 adjacent to a current location on the optimized test path when the counted number of the failing ones of the plurality of test points 38 fails to exceed the failure threshold value and when the respective predictive RF result for the one of the plurality of test points 38 adjacent to the current location is below the passing threshold value. However, when, the counted number of the failing ones of the plurality of test points 38 fails to exceed the failure threshold value, but the respective predictive RF result for all of the plurality of test points 38 adjacent to the current location fails to be below the passing threshold value, the programmable processor 28 can select the subsequent locations on the optimized test path as those of the plurality of test points 38 on the shortest path to one of the plurality of test points 38 for which the respective predictive RF result is a next lowest one as compared with the respective predictive RF result for the one of the plurality of test points 38 associated with the current location.

In some embodiments, the target building 32 can contain multiple floors, and in these embodiments, the programmable processor 28 can divide the plurality of test points 38 into groups corresponding to the multiple floors of the target building 32. Furthermore, in these embodiments, the programmable processor 28 can account for the multiple floors of the target building 32 when selecting the subsequent locations on the optimized test path beyond the starting location. For example, in these embodiments, when the counted number of the failing ones of the plurality of test points 38 fails to exceed the failure threshold value and when the respective actual RF signal value for all of the plurality of test points 38 for which the respective predictive RF result is below the passing threshold value have been measured, the signal measurement device 26 can instruct the user to first measure remaining ones of the plurality of test points 38 that have yet to be measured on a currently occupied one of the multiple floors, then measure remaining ones of the plurality of test points 38 that have yet to be measured on adjacent ones of the multiple floors higher than the current occupied one of the multiple floors, and finally measure remaining ones of the plurality of the test points 38 that have yet to be measured on any of the multiple floors lower than the currently occupied one of the multiple floors.

In particular, when the respective predictive RF result for all of the plurality of test points 38 adjacent to the current location fails to be below the passing threshold value and one of the multiple floors on which the current location is located includes unselected ones of the plurality of test points 38 for which the respective predictive RF result is below the passing threshold value, the programmable processor 28 can select the subsequent locations on the optimized test path as those of the plurality of test points 38 on the shortest path to one of the plurality of test points 38 on that one of the multiple floors and for which the respective predictive RF result is the next lowest one as compared with the respective predictive RF result for the one of the plurality of test points 38 associated with the current location. Conversely, when the respective predictive RF result for all of the plurality of test points 38 adjacent to the current location fails to be below the passing threshold value and the one of the multiple floors on which the current location is located fails to include the unselected ones of the plurality of test points 38 for which the respective predictive RF result is below the passing threshold value, the programmable processor 28 can select the subsequent locations on the optimized test path as those of the plurality of test points 38 on the shortest path to one of the plurality of test points 38 on a different one of the multiple floors and for which the respective predictive RF result is the next lowest one as compared with the respective predictive RF result for the unselected ones of the plurality of test points 38 for which the respective predictive RF result is below the passing threshold value.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    assigning each of a plurality of test points to a respective physical space of a target building
    using previously collected grid test results that are relevant to the target building to calculate a respective predictive RF result for each of the plurality of test points;
    using the respective predictive RF result for each of the plurality of test points to calculate an optimized test path through the target building;
    measuring a respective actual RF signal value of each of the plurality of test points in succession along the optimized test path;
    counting failing ones of the plurality of test points for which the respective actual RF signal value is below a passing threshold value; and
    when a counted number of the failing ones of the plurality of test points exceeds a failure threshold value, stopping measurements of the respective actual RF signal value of each of the plurality of test points in succession along the optimized test path.

2. The method of claim 1 further comprising:
identifying the previously collected grid test results that are relevant to the target building as those that are associated with a plurality of geographic areas within a respective line of sight of each of the plurality of test points.

3. The method of claim 1 further comprising:
calculating the respective predictive RF result for each of the plurality of test points by decreasing the previously collected grid test results that are relevant to the target building based on (1) a respective size of a respective one of the plurality of test points, (2) a distance between the respective one of the plurality of test points and a plurality of geographic areas associated with the previously collected grid test results, and (3) applicable radiation loss factors.

4. The method of claim 3 wherein the applicable radiation loss factors include standard radiation loss through air.

5. The method of claim 3 wherein the applicable radiation loss factors include standard radiation loss through standard building materials and a thickness of walls of the target building and adjacent buildings in which the plurality of geographic areas are located.

6. The method of claim 1 further comprising:
identifying the previously collected grid test results that are relevant to the target building as those that are associated with a plurality of geographic areas in adjacent buildings that are closest to the target building.

7. The method of claim 1 further comprising:
designating as a starting location for the optimized test path a first one of the plurality of test points for which the respective predictive RF result is lowest as compared with the respective predictive RF result for each of the plurality of test points; and
iteratively designating subsequent locations on the optimized test path beyond the starting location as (1) one of the plurality of test points adjacent to a current location when the respective predictive RF result for the one of the plurality of test points adjacent to the current location is below the passing threshold value and (2) those of the plurality of test points on a shortest path to one of the plurality of test points for which the respective predictive RF result is a next lowest one as compared with the respective predictive RF result for the one of the plurality of test points associated with the current location when the respective predictive RF result for all of the plurality of test points adjacent to the current location fails to be below the passing threshold value.

8. The method of claim 1 further comprising:
designating as a starting location for the optimized test path a first one of the plurality of test points for which the respective predictive RF result is lowest as compared with the respective predictive RF result for each of the plurality of test points; and
iteratively designating subsequent locations on the optimized test path beyond the starting location as (1) one of the plurality of test points adjacent to a current location when the respective predictive RF result for the one of the plurality of test points adjacent to the current location is below the passing threshold value, (2) those of the plurality of test points on a shortest path to one of the plurality of test points on a floor on which the current location is located and for which the respective predictive RF result is a next lowest one as compared with the respective predictive RF result for the one of the plurality of test points associated with the current location when the respective predictive RF result for all of the plurality of test points adjacent to the current location fails to be below the passing threshold value and the floor on which the current location is located includes unselected ones of the plurality of test points for which the respective predictive RF result is below the passing threshold value, and (3) those of the plurality of test points on the shortest path to one of the plurality of test points outside of the floor on which the current location is located and for which the respective predictive RF result is a next lowest one as compared with the respective predictive RF result for the unselected ones of the plurality of test points for which the respective predictive RF result is below the passing threshold value when the respective predictive RF result for all of the plurality of test points adjacent to the current location fails to be below the passing threshold value and the floor on which the current location is located fails to include the unselected ones of the plurality of test points for which the respective predictive RF result is below the passing threshold value.

9. The method of claim 1 wherein the optimized test path includes 1-MPTp of the plurality of test points for which the respective predictive RF result is below the passing threshold value, where MPTp is a minimum pass threshold percentage.

10. A system comprising:
a programmable processor;
a transceiver;
a database storing previously collected grid test results; and
a signal measurement device,
wherein the programmable processor assigns each of a plurality of test points to a respective physical space of a target building, retrieves the previously collected grid test results that are relevant to the target building from the database, uses the previously collected grid test results that are relevant to the target building to calculate a respective predictive RF result for each of the plurality of test points, uses the respective predictive RF result for each of the plurality of test points to calculate an optimized test path through the target building, and transmits the optimized test path to the signal meter, and
wherein the signal meter measures a respective actual RF signal value of each of the plurality of test points in succession along the optimized test path, counts failing ones of the of the plurality of test points for which the respective actual RF signal value is below a passing threshold value, and when a counted number of the failing ones of the plurality of test points exceeds a failure threshold value, stops measurements of the respective actual RF signal value of each of the plurality of test points in succession along the optimized test path.

11. The system of claim 10 wherein the programmable processor identifies the previously collected grid test results that are relevant to the target building as those that are associated with a plurality of geographic areas within a respective line of sight of each plurality of test points.

12. The system of claim 10 wherein the programmable processor calculates the respective predictive RF result for each of the plurality of test points by decreasing the previously collected grid test results that are relevant to the target building based on (1) a respective size of a respective one of the plurality of test points, (2) a distance between the respective one of the plurality of test points and a plurality of geographic areas associated with the previously collected grid test results, and (3) applicable radiation loss factors.

13. The system of claim 12 wherein the applicable radiation loss factors include standard radiation loss through air.

14. The system of claim 12 wherein the applicable radiation loss factors include standard radiation loss through standard building materials and a thickness of walls of the target building and adjacent buildings in which the plurality of geographic areas are located.

15. The system of claim 10 wherein the programmable processor identifies the previously collected grid test results that are relevant to the target building as those that are associated with a plurality of geographic areas in adjacent buildings that are closest to the target building.

16. The system of claim 10 wherein the programmable processor designates as a starting location for the optimized test path a first one of the plurality of test points for which the respective predictive RF result is lowest as compared with the respective predictive RF result for each of the plurality of test points, and, wherein the programmable processor iteratively designates subsequent locations on the optimized test path beyond the starting location as (1) one of the plurality of test points adjacent to a current location when the respective predictive RF result for the one of the plurality of test points adjacent to the current location is below the passing threshold value and (2) those of the plurality of test points on a shortest path to one of the plurality of test points for which the respective predictive RF result is a next lowest one as compared with the respective predictive RF result for the one of the plurality of test points associated with the current location when the respective predictive RF result for all of the plurality of test points adjacent to the current location fails to be below the passing threshold value.

17. The system of claim 10 wherein the programmable processor designates as a starting location for the optimized test path a first one of the plurality of test points for which the respective predictive RF result is lowest as compared with the respective predictive RF result for each of the plurality of test points, and wherein the programmable processor iteratively designates subsequent locations on the optimized test path beyond the starting location as (1) one of the plurality of test points adjacent to a current location when the respective predictive RF result for the one of the plurality of test points adjacent to the current location is below the passing threshold value, (2) those of the plurality of test points on a shortest path to one of the plurality of test points on a floor on which the current location is located and for which the respective predictive RF result is a next lowest one as compared with the respective predictive RF result for the one of the plurality of test points associated with the current location when the respective predictive RF result for all of the plurality of test points adjacent to the current location fails to be below the passing threshold value and the floor on which the current location is located includes unselected ones of the plurality of test points for which the respective predictive RF result is below the passing threshold value, and (3) those of the plurality of test points on the shortest path to one of the plurality of test points outside of the floor on which the current location is located and for which the respective predictive RF result is a next lowest one as compared with the respective predictive RF result for the unselected ones of the plurality of test points for which the respective predictive RF result is below the passing threshold value when the respective predictive RF result for all of the plurality of test points adjacent to the current location fails to be below the passing threshold value and the floor on which the current location is located fails to include the unselected ones of the plurality of test points for which the respective predictive RF result is below the passing threshold value.

18. The system of claim 10 wherein the optimized test path includes 1-MPTp of the plurality of test points for which the respective predictive RF result is below the passing threshold value, where MPTp is a minimum pass threshold percentage.

* * * * *